United States Patent
Hirose et al.

(10) Patent No.: US 11,442,209 B2
(45) Date of Patent: Sep. 13, 2022

(54) MULTILAYER FILM STACK

(71) Applicant: TOYOBO CO., LTD., Osaka (JP)

(72) Inventors: Amane Hirose, Tokyo (JP); Mitsuo Tojo, Tokyo (JP)

(73) Assignee: TOYOBO CO., LTD., Osaka (JP)

(*) Notice: Subject to any disclaimer, the term of this patent is extended or adjusted under 35 U.S.C. 154(b) by 0 days.

(21) Appl. No.: 16/627,978

(22) PCT Filed: Jul. 4, 2018

(86) PCT No.: PCT/JP2018/025294
§ 371 (c)(1),
(2) Date: Dec. 31, 2019

(87) PCT Pub. No.: WO2019/009316
PCT Pub. Date: Jan. 10, 2019

(65) Prior Publication Data
US 2020/0132902 A1 Apr. 30, 2020

(30) Foreign Application Priority Data
Jul. 7, 2017 (JP) .............................. JP2017-133703

(51) Int. Cl.
*G02B 5/30* (2006.01)
*B32B 7/022* (2019.01)
(Continued)

(52) U.S. Cl.
CPC .............. *G02B 5/305* (2013.01); *B32B 7/022* (2019.01); *B32B 27/08* (2013.01); *B32B 27/36* (2013.01);
(Continued)

(58) Field of Classification Search
CPC .. G02B 5/00–5/32; B32B 27/00–27/42; B32B 7/00–7/14
See application file for complete search history.

(56) References Cited

U.S. PATENT DOCUMENTS 5,389,324 A 2/1995 Lewis et al.
5,882,774 A * 3/1999 Jonza ...................... B32B 27/08
428/212

(Continued)

FOREIGN PATENT DOCUMENTS

EP 0488544 A1 6/1992
JP H04-268505 A 9/1992
(Continued)

OTHER PUBLICATIONS

Japanese Patent Office, International Search Report in International Patent Application No. PCT/JP2018/025294 (dated Aug. 21, 2018).

*Primary Examiner* — Prashant J Khatri
(74) *Attorney, Agent, or Firm* — Leydig, Voit & Mayer, Ltd.

(57) ABSTRACT

The invention provides a multilayer laminated film containing a multilayer laminated structure of alternately laminated first and second layers, and a thick film layer in contact therewith. The multilayer laminated structure has a layer thickness profile in terms of the physical thickness of repeating first and second layers. The layer thickness profile has a monotonously increasing thickness region and a thin layer region, which has at least three repeating units, a L2/L1 ratio of 0.85 or less, and a A2/L1 ratio of 0.70 or less, where L1 is the maximum repeating unit thickness in the monotonously increasing thickness region, L2 is the maximum repeating unit thickness in the thin layer region, and A2 is the average repeating unit thickness in the thin layer region. The thin layer region is on the thicker side of the monotonously increasing thickness region and in contact with the thick film layer.

18 Claims, 2 Drawing Sheets

(51) Int. Cl.
  *B32B 27/08* (2006.01)
  *B32B 27/36* (2006.01)
  *G02F 1/1335* (2006.01)
(52) U.S. Cl.
  CPC ..... *G02B 5/3083* (2013.01); *G02F 1/133536*
     (2013.01); *B32B 2250/05* (2013.01); *B32B*
     *2250/42* (2013.01)

(56) References Cited

U.S. PATENT DOCUMENTS

| | | | | |
|---|---|---|---|---|
| 5,976,424 | A | * | 11/1999 | Weber .................... B29C 48/08 264/1.6 |
| 6,207,260 | B1 | * | 3/2001 | Wheatley ............... G02B 5/282 428/212 |
| 6,677,031 | B1 | | 1/2004 | Murooka et al. |
| 2008/0151147 | A1 | | 6/2008 | Weber et al. |
| 2009/0223704 | A1 | * | 9/2009 | Osada .................... B29C 55/143 174/258 |
| 2014/0268346 | A1 | * | 9/2014 | Weber ................. G02B 5/0841 359/589 |
| 2015/0023054 | A1 | * | 1/2015 | Goda .................... G02B 6/0055 362/607 |
| 2016/0109628 | A1 | * | 4/2016 | Weber .................... G02B 5/208 359/352 |
| 2016/0216427 | A1 | | 7/2016 | Johnson et al. |
| 2019/0250320 | A1 | | 8/2019 | Johnson et al. |
| 2019/0322087 | A1 | | 10/2019 | Nakagawa et al. |
| 2020/0209454 | A1 | | 7/2020 | Johnson et al. |

FOREIGN PATENT DOCUMENTS

| | | | |
|---|---|---|---|
| JP | H09-506837 | A | 7/1997 |
| JP | H09-506984 | A | 7/1997 |
| JP | 2002-509280 | A | 3/2002 |
| JP | 2003-251675 | A | 9/2003 |
| JP | 2016-520861 | A | 7/2016 |
| JP | 2016-535292 | A | 11/2016 |
| TW | 201522043 | A | 6/2015 |
| WO | WO 1995/017303 | A1 | 6/1995 |
| WO | WO 1995/017699 | A1 | 6/1995 |
| WO | WO 1999/036809 | A1 | 7/1999 |
| WO | WO 2001/047711 | A1 | 7/2001 |
| WO | WO 2014/172258 | A1 | 10/2014 |
| WO | WO 2015/048624 | A1 | 4/2015 |
| WO | WO-2017087493 | A1 * | 5/2017 .......... G02B 5/3041 |
| WO | WO 2018/101230 | A1 | 6/2018 |

* cited by examiner

MULTILAYER FILM STACK

CROSS-REFERENCE TO RELATED APPLICATIONS

This patent application is the U.S. national phase of International Patent Application No. PCT/JP2018/025294, filed Jul. 4, 2018, which claims the benefit of Japanese Patent Application No. 2017-133703, filed Jul. 7, 2017, which are incorporated by reference in their entireties herein.

TECHNICAL FIELD

The present disclosure relates to a multilayer laminated film.

BACKGROUND ART

A multilayer laminated film obtained by alternately laminating a layer having a low refractive index (a low refractive index layer) and a layer having a high refractive index (a high refractive index layer) can be used as an optical interference film, which selectively reflects or transmits light of a specific wavelength due to optical interference caused by the structure between the layers.

Such a multilayer laminated film can reflect or transmit light over a broad wavelength range by gradually changing the thickness of each layer along the thickness direction of the film or attaching the film to a film having a different reflection peak. The multilayer laminated film can also exhibit high reflectance equivalent to that of a film using a metal and can be used as a metallic gloss film or a reflective mirror. Further, it is known that when such a multilayer laminated film is stretched in one direction, the film can be used as a reflective polarizing film, which reflects only a specific polarised light component, and can be used for, for example, a luminance-improving member for a liquid crystal display (e.g., Patent Literature 1 to 4)

For example, in a multilayer laminated film disclosed in Patent Literature 2 and the like, which uses polyethylene-2,6-naphthalene dicarboxylate ("2,6-PEN") for a high refractive index layer and PEN copolymerized with a thermoplastic elastomer or terephthalic acid in an amount of 30 mol % for a low refractive index layer, a level of polarization performance is achieved by increasing the difference in the refractive index between the layers in an uniaxial stretching direction to enhance the reflectance of the p-polarized light (polarized light parallel to the incidence plane including the uniaxial stretching direction) and, on the other hand, decreasing the difference in the refractive index between the layers in the direction perpendicular to the in-plane uniaxial stretching direction to enhance the transmittance of the s-polarized light (polarized light perpendicular to the incidence plane including the uniaxial stretching direction).

Such a multilayer laminated film may have a thick film layer, for example, in order for the film to have a thickness suitable for good handling (Patent Literature 5).

PTL 1: JPH04-268505A
PTL 2: JPH09-506837A
PTL 3: JPH09-506984A
PTL 4: WO01/47711
PTL 5: JP2003-251675A

SUMMARY OF INVENTION

Technical Problem

However, conventional multilayer laminated films have the problem that adhesion between the layers may not be sufficient, and that delamination may thus occur, for example, due to stress applied during post-processing or the like.

The present inventors conducted research on the delamination and found that when such a film has a thick film layer, delamination between the multilayer structure portion and the thick film layer is especially likely to occur. The inventors focused on this.

An object of one embodiment of the present invention is to provide a multilayer laminated film having improved interlayer adhesion.

Solution to Problem

The present inventors conducted extensive research to solve the above problem, and found that interlayer adhesion differs between the thick and thin sides of the monotonously increasing region of a multilayer structure portion and focused on a stress relieving function. The inventors then found that interlayer adhesion is also improved on the side having lower interlayer adhesion by facilitating stress relief. The present invention has been thus accomplished.

The present invention includes the following embodiments.

1. A multilayer laminated film comprising a multilayer laminated structure in which a first layer containing a first resin and a second layer containing a second resin are alternately laminated, and a thick film layer in contact with the multilayer laminated structure,
   wherein the multilayer laminated structure has a layer thickness profile in terms of a physical thickness of a repeating unit having one first layer and one second layer, and the layer thickness profile has a monotonously increasing thickness region and a thin layer region;
   the thin layer region has at least, three repeating units and is a region in which the L2/L1 ratio is 0.85 or less, where L2 is the maximum repeating unit thickness in the thin layer region, and L1 is the maximum repeating unit thickness in the monotonously increasing thickness region, and the A2/L1 ratio is 0.70 or less, where A2 is the average repeating unit thickness in the thin layer region, and L1 is the maximum repeating unit thickness in the monotonously increasing thickness region; and
   the thin layer region is on the thicker side of the monotonously increasing thickness region and is present in contact with the thick film layer.
2. The multilayer laminated film according to Item 1, wherein the L2/S1 ratio exceeds 1.0, where L2 is the maximum repeating unit thickness in the thin layer region, and S1 is the minimum repeating unit thickness in the monotonously increasing thickness region.
3. The multilayer laminated film according to Item 1 or 2, wherein the first layer is birefringent, the second layer is isotropic, and the film is capable of reflecting light at a wavelength of 380 to 730 nm by optical interference of the layers.
4. A luminance-improving member comprising the multilayer laminated film according to any one of Items 1 to 3.
5. A polarizer for a liquid crystal display, the polarizer comprising the multilayer laminated film according to any one of Items 1 to 3.

Advantageous Effects of Invention

One embodiment of the present invention can provide a multilayer laminated film having improved inter layer adhesion.

Moreover, according to one embodiment of the present invention, when the film is used as, for example, a luminance-improving member or a reflective polarizer, both of which are required to have polarization performance, the film is less susceptible to delamination due to an external force applied during, for example, attachment to another member, assembly of a liquid crystal display, or use. Thus, a more highly reliable luminance-improving member, polarizer for a liquid crystal display, and the like can be provided.

DESCRIPTION OF EMBODIMENTS

Each configuration of the present invention is described in detail below.
Multilayer Laminated Film The multilayer laminated film according to one embodiment of the present invention comprises a multilayer laminated structure in which a first layer composed mainly of a first resin and a second layer composed mainly of a second resin are alternately laminated. In the present disclosure/the phrase "composed mainly of" means that each layer contains its own resin. Specifically/each resin makes up 70 masses or more/preferably 80 mass-6 or more, and more preferably 90 mass's or more of the total mass of its layer.

In one embodiment of the present invention, an optical interference effect of the first layer and the second layer may be exhibited to enable reflection of light in any wavelength range. In this case, it is preferable that the first layer be birefringent and that the second layer be isotropic. In order to achieve the interference effect, the total number of layers laminated is preferably 30 or more.

In order for the film to exhibit such reflection properties, the multilayer laminated structure is preferably a structure in which a first layer and a second layer are alternately laminated in the thickness direction so that the total number of the first and second layers is 30 or more, wherein the first layer is a birefringent layer composed mainly of a first resin and having a thickness of 10 to 1000 nm, and the second layer is an isotropic layer composed mainly of a second resin and having a thickness of 10 to 1000 nm. In this case, although the resins forming the layers are described below in detail, the resins are not particularly limited as long as a birefringent layer and an isotropic layer can be individually formed. From the viewpoint of readily producing the film, both the resins are preferably thermoplastic resins. In the present disclosure, with respect to the refractive indexes in the machine direction, the traverse direction, and the thickness direction, a film having a difference between the maximum and the minimum of 0.1 or more is defined as being birefringent, and a film having a difference between the maximum and the minimum of less than 0.1 is defined as being isotropic.

Further, the multilayer laminated film according to one embodiment of the present invention comprises a thick film layer in contact with the multilayer laminated structure. In the multilayer laminated structure, the thickness of each layer affects the optical characteristics. Thus, if there is a desired optical characteristic, the thickness of each layer cannot be changed unnecessarily. The use of such a thick film layer thus makes it possible to increase the thickness of the entire multilayer laminated film, thereby, for example, improving handling.

Figure 1:
FIG. 1 schematically illustrates an example of the laminated structure of the multilayer laminated film of the present invention.

FIG. 1 schematically illustrates an example of the laminated structure of the multilayer laminated film of the present invention. In FIG. 1, multilayer laminated structures 3 are in contact with thick film layers 1 and 2.

The multilayer laminated film according to one embodiment of the present invention can reflect light in a broad wavelength range since the film comprises the first and second layers having various optical thicknesses. This is because the reflection wavelength results from the optical thickness of each layer of the multilayer laminated film. In general, the reflection wavelength of the multilayer laminated film is represented by the following equation 1.

$$\lambda = 2(n_1 \times d_1 + n_2 \times d_2) \qquad \text{equation 1}$$

wherein λ represents the reflection wavelength (nm), n1 and n2 represent the refractive index of the first layer and the refractive index of the second layer, respectively, and d1 and d2 represent the physical thickness (nm) of the first layer and the physical thickness (nm) of the second layer, respectively.

In view of the above, the multilayer laminated structure may have a layer thickness profile that is capable of reflecting light in the broad wavelength range of 380 to 760 nm. For example, the multilayer laminated film can be designed to reflect light in a broad wavelength range by having the thickness range increased in the monotonously increasing region, or it can be designed to reflect light in a specific wavelength range in the monotonously increasing region and reflect light outside the specific wavelength range in other regions in order to reflect light in a broad wavelength range as a whole.

To increase the thickness range in the monotonously increasing region, for example, the minimum physical thickness of the repeating units in the monotonously increasing region may be about 130 nm or less, preferably about 128 nm or less, preferably about 80 to 130 nm, and preferably about 86 to 128 nm, and the maximum physical thickness of the repeating units in the monotonously increasing region may be about 240 nm or more, preferably about 245 nm or more, preferably about 240 to 320 nm, and preferably about 245 to 314 nm.

In the present disclosure, the phrase "capable of reflecting" means that in at least any one direction in the film plane, the average reflectance at normal incidence of polarized light parallel to the direction is 50% or more. The reflection may be such that the average reflectance in each wavelength range is 50% or more, preferably 60% or more, and more preferably 70% or more.

In the present disclosure, the average reflectance is a value obtained by subtracting the average transmittance at a wavelength of 380 to 780 nm from 100, using a polarizing film measurement apparatus (VAP7070S produced by JASCO Corporation).
Layer Thickness Profile In one embodiment of the present invention, interlayer adhesion can be improved by using a specific layer thickness profile of the multilayer laminated structure.

Specifically, the multilayer laminated structure according to one embodiment of the present invention has a layer thickness profile in terms of the physical thickness of a repeating unit having one first layer and one second layer. The layer thickness profile has a monotonously increasing thickness region and a thin layer region. The thin layer region has at least three repeating units and is a region in which the L2/L1 ratio is 0.85 or less, where L2 is the maximum repeating unit thickness in the thin layer region, and L1 is the maximum repeating unit thickness in the monotonously increasing thickness region, and the A2/L1 ratio is 0.70 or less, where A2 is the average repeating unit thickness in the thin layer region, and L1 is the maximum repeating unit thickness in the monotonously increasing thickness region. The thin layer region is configured so that the thin layer region is on the thicker side of the monotonously increasing thickness region and is in contact with a thick film layer.

Figure 2:
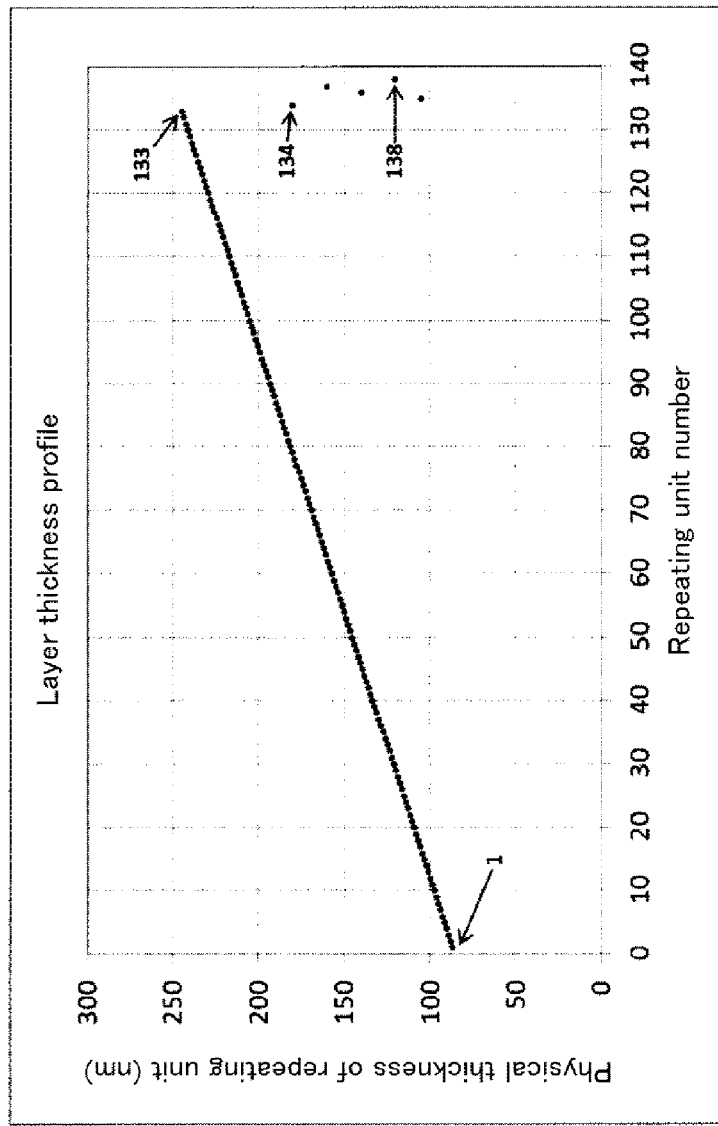
FIG. 2 schematically illustrates an example of the layer thickness profile of the multilayer laminated structure according to the present invention.

FIG. 2 schematically illustrates an example of the layer thickness profile of the multilayer laminated structure according to the present invention. Here, repeating unit Nos. 1 to 133 indicate the monotonously increasing thickness region, and repeating unit Nos. 134 to 138 indicate the thin layer region. One number is assigned to one repeating unit (which has one first layer and one second layer). In FIG. 2, the larger the repeating unit number, the thicker the thickness in the monotonously increasing thickness region. On the side of repeating unit No. 138 where the repeating unit number is larger than 133, a thick film layer is provided in contact with repeating unit No. 138. Another region may be provided between the monotonously increasing region and the thin layer region.

In one embodiment of the present invention, the number of layers can be increased by doubling or the like as described later. In such a case, it is only necessary to look at the layer thickness profile of one packet, and one such packet can be a multilayer laminated film. When looking at the overall layer thickness profile of the multilayer laminated film, for example, if there are multiple portions having similar layer thickness profiles, the portions can be regarded as packets, and multilayer structure portions separated by, for example, an intermediate layer can be regarded as separate packets.

Physical Thickness of Repeating Unit

In the present disclosure, the physical thickness of the repeating unit is represented by the following equation 2.

$$dp = d1 + d2 \quad \text{(equation 2)}$$

wherein dp represents the physical thickness of the repeating unit, and d1 and d2 represent the physical thicknesses (nm) of the first layer and the second layer that constitute the repeating unit, respectively.

The physical thickness as used herein can be determined from a photograph taken using a transmission electron microscope.

Monotonously Increasing Thickness Region

In one embodiment of the present invention, the "monotonously increasing thickness region" is preferably such that a repeating unit on the thicker side is thicker than a repeating unit on the thinner side in the entire monotonously increasing thickness region; however, the monotonously increasing thickness region is not limited to this. It is only necessary that a trend for the thickness to increase from the thinner side to the thicker side as a whole is shown. More specifically/the repeating units are numbered from the thinner physical thickness side toward the thicker physical thickness side of the repeating units, and the numbers are put on the horizontal axis. The physical thickness of each repeating unit is then plotted on the vertical axis. The repeating units in the region in which the thickness shows an increasing trend are equally divided into five areas in terms of the number of repeating units. When the average thickness in each equally divided area monotonously increases in the direction in which the thickness increases, the thickness is regarded as monotonously increasing; otherwise, the thickness is not regarded as monotonously increasing.

In some embodiments, the monotonously increasing thickness region may make up 80% or more, preferably 90% or more, and more preferably 95% or more, of the multilayer laminated structure in terms of the number of repeating units.

When the first layer and the second layer are alternately laminated to form a multilayer laminated structure, the range of the monotonously increasing region may be such that light of a wavelength of 330 to 780 nm can be reflected by optical interference as the multilayer laminated structure. Further, the range of the monotonously increasing region may be greater than the range in which light of a wavelength of 330 to 780 nm can be reflected when a multilayer laminated structure is formed.

Thin Layer Region

In one embodiment of the present invention, the "thin layer regions" is a portion of the thickness profile that does not belong to the monotonously increasing thickness region, and the "chin layer region" is present on the thicker side of the monotonously increasing thickness region, and is composed of at least three repeating units.

The present inventors found that delamination of a multilayer laminated film is likely to occur at the boundary interface between a thick film layer and a multilayer laminated structure, and that a region in which thin first and second layers are alternately laminated has higher adhesion to a thick film layer than a region in which thick first and second layers are alternately laminated, and the inventors focused on this. Providing a thin layer region (a relatively thin region) between the thicker side of the monotonously increasing thickness region (i.e., an area in which relatively thick first and second layers are alternately laminated) and a thick film layer is considered to reduce stress generated at the boundary interface; with the thick film layer to thus improve interlayer adhesion because the thin layer region is a region in which relatively thin first and second layers are alternately laminated.

The maximum repeating unit thickness in the thin layer region is required to be less than the maximum repeating unit thickness in the monotonously increasing thickness region. Specifically/the L2/L1 ratio is 0.85 or less, where L2 is the maximum repeating unit thickness in the thin layer region, and L1 is the maximum repeating unit thickness in the monotonously increasing thickness region. Moreover, the A2/L1 ratio is 0.70 or less, where A2 is the average repeating unit thickness in the thin layer region, and L1 is the maximum repeating unit thickness in the monotonously increasing thickness region. When the film has such a thin layer region, an interlayer adhesion improvement effect is attained. From this viewpoint, L2/L1 is preferably 0.80 or less, more preferably 0.75 or less, and even more preferably 0.70 or less. Further, A2/L1 is preferably 0.65 or less, more preferably 0.60 or less, and even more preferably 0.55 or less.

When the maximum repeating unit thickness L2 in the thin layer region is equal to or less than the minimum repeating unit thickness S1 in the monotonously increasing thickness region the thin layer region is generally considerably thinner than the monotonously increasing region on the whole, and it tends to be difficult to produce such a thin film with high accuracy. If a thin film is not formed, an interlayer adhesion improvement effect tends to be reduced. Thus, the ratio of the maximum repeating unit thickness L2 in the thin layer region to the minimum repeating unit thickness S1 in the monotonously increasing region, i.e., L2/S1, is preferably in the range of more than 1.0, more preferably 1.05 or more, even more preferably 1.10 or more, and particularly preferably 1.15 or more. The ratio of the average repeating unit thickness A2 in the thin layer region to the minimum repeating unit thickness S1 in the monotonously increasing region, i.e., A2/S1, is preferably in the range of more than 1.0, more preferably 1.05 or more, even more preferably 1.10 or more, and particularly preferably 1.15 or more.

The number of repeating units of the first layer and the second layer in the thin layer region is 3 or more and may be 4 or more or 5 or more. Interlayer adhesion is further improved when the number of repeating units is moderately large. However, if the number of repeating units in the thin layer region is too large, the number of repeating units in the monotonously increasing region tends to decrease, and reflection tends to be difficult over a broad wavelength range. Accordingly, the number of repeating units in the thin layer region is preferably 13 or less, or 10 or less. The thin layer region may have the first layer or the second layer alone in addition to the repeating units of the first layer and the second layer.

Specifically, the following may be used as an embodiment of the thin layer region.

an embodiment in which the number of repeating units is 3, and L2/L1 and A2/L1 described above, preferably L2/S1 and A2/S1 described above, are satisfied.

an embodiment in which the number of repeating units is 4, and L2/L1 and A2/L1 described above, preferably L2/S1 and A2/S1 described above, are satisfied.

an embodiment in which the number of repeating units is 5, and L2/L1 and A2/L1 described above, preferably L2/S1 and A2/S1 described above, are satisfied.

an embodiment in which the number of repeating units is 6, and L2/L1 and A2/L1 described above, preferably L2/S1 and A2/S1 described above, are satisfied.

Similarly, when the number of repeating units is 7, 8, 9, 10, 11, 12, 13, 14, or 15, an embodiment in which L2/L1 and A2/L1 described above, preferably L2/S1 and A2/S1 described above, are satisfied may be adopted. When the number of repeating units is 4 or more, A2/L1 described above is preferably satisfied also in the range of three repeating units from the thick film layer, but it may not be satisfied. This is because the entire thin layer region, including the fourth and subsequent repeating units from the thick film layer, can have an adhesion improvement effect.

In one embodiment of the present invention, since the film has a thin layer region in the appropriate thickness range so that the thin layer region is in contact with a thick film layer, the adhesion between the multilayer laminated structure and the thick film layer is improved.

Structure of Multilayer Laminated Film

The interlayer adhesion improvement effect according to one embodiment of the present invention is achieved regardless of the use as long as the film is a multilayer laminated film comprising a multilayer laminated structure and a thick film layer in contact with the multilayer laminated structure.

A preferred application of the multilayer laminated film is, for example, an application that uses optical interference of the first layer and the second layer. A preferable structure of the multilayer laminated film suitable for an application that uses such optical interference is described below.

First Layer

The first layer of the multilayer laminated film according to one embodiment of the present invention can be a birefringent layer. In this case, the resin forming the first layer (also referred to as the "first resin" in the present disclosure) is capable of forming a birefringent layer. Accordingly, the resin forming the first layer is preferably an oriented crystalline resin, and the oriented crystalline resin is especially preferably a polyester. The polyester preferably contains ethylene terephthalate units and/or ethylene naphthalate units, more preferably ethylene naphthalate units, in an amount in the range of 80 to 100 mol %, based on the repeating units of the polyester, because the layer having a higher refractive index can be readily formed, which makes it easy to increase the difference in the refractive index between the first layer and the second layer. When resins are used in combination, the above content is the total content.

Polyester for First Layer

A preferred polyester for the first layer contains a naphthalenedicarboxylic acid component as a dicarboxylic acid component, and the content of the naphthalenedicarboxylic acid component is preferably 80 to 100 mol %, based on the dicarboxylic acid component of the polyester. Examples of the naphthalenedicarboxylic acid component include a 2,6-naphthalenedicarboxylic acid component, a 2,7-naphthalenedicarboxylic acid component, a component derived from a combination of these components, and a derivative component thereof, and especially preferred examples include a 2,6-naphthalenedicarboxylic acid component and a derivative component thereof. The content of the naphthalenedicarboxylic acid component is preferably 85 mol % or more, more preferably 90 mol % or more, and is preferably less than 100 mol %, more preferably 98 mol % or less, and even more preferably 95 mol % or less.

The polyester for the first layer may further contain a terephthalic acid component, an isophthalic acid component, or the like, especially preferably a terephthalic acid component, as a dicarboxylic acid component of the polyester for the first layer, in addition to the naphthalenedicarboxylic acid component as long as the object of the present invention is not impaired. The content of the second dicarboxylic acid component is preferably in the range of more than 0 mol % and 20 mol % or less. The content of the second dicarboxylic acid component is more preferably 2 mol % or more, and even more preferably 5 mol % or more, and is more preferably 15 mol's or less, and even more preferably 10 mol % or less.

When the multilayer laminated film is used as a luminance-improving member or a reflective polarizer for use in a liquid crystal display or the like, it is preferred that the first layer have relatively higher refractive index properties than the second layer, that the second layer have relatively lower refractive index properties than the first layer, and that the film be stretched in a uniaxial direction. In this case, in the present disclosure, the uniaxially stretching direction may be referred to as the "TD direction," the direction perpendicular to the TD direction in the film plane may be referred to as the "MD direction" (also referred to as the "non-stretching direction"), and the direction perpendicular to the film plane may be referred to as the "2 direction" (also referred to as the "thickness direction").

By using the above polyester containing a naphthalenedicarboxylic acid component as a main component in the first layer, high birefringence characteristics with uniaxial orientation property can be achieved while a high refractive index is exhibited in the TD direction, and the difference in the refractive index in the TD direction between the first layer and the second layer can be increased, contributing to a high degree of polarization. However, if the content of the naphthalenedicarboxylic acid component is less than the lower limit, amorphous properties are increased, and the difference between the refractive index nTD in the TD direction and the refractive index nMD in the MD direction tends to be decreased; therefore, it tends to be difficult to obtain satisfactory reflection performance with respect to the p-polarized light component in the present invention, which is defined as a polarized light component parallel to the incidence plane that includes the uniaxially stretching direction (TD direction), in the multilayer laminated film in which the film surface is used as a reflection surface. The s-polarized light component in the present invention is defined as a polarized light component perpendicular to the incidence plane that includes the uniaxially stretching direction (TD direction), in the multilayer laminated film in which the film surface is used as a reflection surface.

As a diol component of the preferred polyester for the first layer, an ethylene glycol component is used. The content of the ethylene glycol component is preferably 60 to 100 mol %, more preferably 85 to 100 mol %, and even more preferably 90 to 100 mol %, and particularly preferably 90 to 98 mol %, based on the diol component of the polyester. If the amount of the diol component is less than the lower limit, the uniaxial orientation may be impaired.

The polyester for the first layer may further contain a trimethylene glycol component, a tetramethylene glycol component, a cyclohexanedimethanol component, a diethylene glycol component, or the like as a diol component of the polyester for the first layer, in addition to the ethylene glycol component, as long as the object of the present invention is not impaired.

Properties of Polyester for First Layer

The melting point of the polyester for the first layer is preferably in the range of 220 to 290° C., more preferably 230 to 280° C., and even more preferably 240 to 270° C. The melting point can be determined by measurement using a differential scanning calorimeter (DSC). If the melting point of the polyester is more than the upper limit, fluidity is likely to be poor upon molding through melt extrusion, causing, for example, extrusion to be non-uniform. On the other hand, if the melting point is less than the lower limit, although excellent film formability is attained, the mechanical properties etc. of the polyester are likely to worsen, and the refractive index characteristics tend to difficult to exhibit when the film is used as a luminance-improving member or a reflective polarizer for a liquid crystal display.

The glass transition temperature ("Tg") of the polyester for use in the first layer is preferably in the range of 80 to 120° C., more preferably 82 to 118° C., even more preferably 85 to 118° C., and particularly preferably 100 to 115° C. When Tg is in this range, the resulting film has excellent heat resistance and dimensional stability, and the refractive index characteristics are likely to be exhibited when the film is used as a luminance-improving member or a reflective polarizer for a liquid crystal display. The melting point and the glass transition temperature can be adjusted by controlling, for example, the type of copolymer component, the amount of copolymer component, and diethylene glycol, which is a by-product.

The polyester for use in the first layer preferably has an intrinsic viscosity of 0.50 to 0.75 dl/g, more preferably 0.55 to 0.72 dl/g, and even more preferably 0.56 to 0.71 dl/g, as measured at 35° C. using an o-chlorophenol solution. By virtue of having such an intrinsic viscosity, the first layer tends to readily have appropriate oriented crystallinity, and a difference in the refractive index between the first layer and the second layer tends to be readily exhibited.

Second Layer

The second layer of the multilayer laminated film according to one embodiment of the present invention can be an isotropic layer. In this case, the resin forming the second layer (also referred to as the "second resin" in the present disclosure) is capable of forming an isotropic layer. Thus, the resin forming the second layer is preferably an amorphous resin. In particular, an amorphous polyester is preferred. The term "amorphous" does not exclude a resin having slight crystalline properties, and it suffices if the second layer can be isotropic so that the multilayer laminated film according to one embodiment of the present invention exhibits its intended function.

Copolymerized Polyester for Second Layer

The resin forming the second layer is preferably a copolymerized polyester. It is particularly preferable to use a copolymerized polyester containing a naphthalenedicarboxylic acid component, an ethylene glycol component, and a trimethylene glycol component as copolymer components. Examples of the naphthalenedicarboxylic acid component include a 2,6-naphthalenedicarboxylic acid component, a 2,7-naphthalenedicarboxylic acid component, a component derived from a combination of these components, and a derivative component thereof, and especially preferred examples include a 2,6-naphthalenedicarboxylic acid component and a derivative component thereof. The term "copolymer component" used in the present disclosure means any of the components of the polyester. The term "copolymer component" is not limited to a copolymer component as a minor component (which is a component used in an amount for copolymerization of less than 50 mol's, based on the total amount of acid component or the total amount of did component), and also includes a main component (which is a component used in an amount for copolymerization of 50 mol % or more, based on the total amount of acid component or the total amount of did component).

In one embodiment of the present invention, as described above, a polyester having ethylene naphthalate units as a main component is preferably used as the resin for the first layer. In this case, by using a copolymerized polyester containing a naphthalenedicarboxylic acid component as the resin for the second layer, the compatibility with the first layer tends to be increased to improve interlayer adhesion to the first layer, and so delamination is advantageously less likely to occur.

The copolymerized polyester for the second layer preferably contains, as diol components, at least two components, i.e., an ethylene glycol component and a trimethylene glycol component. Of these, the ethylene glycol component is preferably used as the main diol component, from the viewpoint of, for example, film formability.

The copolymerized polyester for the second layer in one embodiment of the present invention preferably contains a trimethylene glycol component as a diol component. The presence of the trimethylene glycol component in the copolymerized polyester compensates for the elasticity of the layer structure to enhance an effect of suppressing delamination.

The amount of the naphthalenedicarboxylic acid component, preferably a 2,6-naphthalenedicarboxylic acid component, is preferably 30 to 100 mol %, more preferably 30 to 80 mol %, and even more preferably 40 to 70 mol %, of the total amount of carboxylic acid component of the copolymerized polyester for the second layer. Using this component in the above range can further increase the adhesion to the first layer. If the content of the naphthalenedicarboxylic acid component is less than the lower limit, the adhesion may be reduced from the viewpoint of compatibility. The upper limit of the content of the naphthalenedicarboxylic acid component is not particularly limited; however, if the amount is too large, it tends to become difficult to produce a difference in the refractive index between the first layer and the second layer. In order to adjust the relationship between the refractive index of the first layer and the refractive index of the second layer, other dicarboxylic acid components may be used for copolymerization.

The amount of the ethylene glycol component is preferably 50 to 95 mol's, more preferably 50 to 90 mol %, even more preferably 50 to 85 mol %, and particularly preferably 50 to 80 mol % of the total amount of diol component of the copolymerized polyester for the second layer. By using this component in the above range, a difference in the refractive index between the first layer and the second layer is likely to be produced.

The amount of the trimethylene glycol component is preferably 3 to 50 mol %, more preferably 5 to 40 mol %, even more preferably 10 to 40 mol %, and particularly preferably 10 to 30 mol, of the total amount of diol component of the copolymerized polyester for the second layer. Using this component in the above range can further increase the interlayer adhesion to the first layer. In addition, a difference in the refractive index between the first layer and the second layer is likely to be produced. If the content of the trimethylene glycol component is less than the lower limit, it tends to be difficult to ensure interlayer adhesion. If the content of the trimethylene glycol component is more than the upper limit, it is difficult to obtain a resin having a desired refractive index and glass transition temperature.

The second layer in one embodiment of the present invention may contain a thermoplastic resin other than the copolymerized polyester as a second polymer component in an amount in the range of 10 mass % or less, based on the mass of the second layer, as long as the object of the present invention is not impaired.

Properties of Polyester for Second Layer

In one embodiment of the present invention, the copolymerized polyester for the second layer preferably has a glass transition temperature of 85° C. or more, more preferably 90 to 150° C., even more preferably 90 to 120° C., and particularly preferably 93 to 1100° C. By virtue of this, more excellent heat resistance can be obtained. In addition, a difference in the refractive index between the first layer and the second layer tends to be readily produced. If the glass transition temperature of the copolymerized polyester for the second layer is less than the lower limit, sufficient heat resistance may not be obtained. For example, when a process such as heat treatment at a temperature around 90° C. is performed, haze increases due to crystallization or embrittlement of the second layer, which may be accompanied by a decrease in the polarization degree in the resulting film when used as a luminance-improving member or a reflective polarizer. If the glass transition temperature of the copolymerized polyester for the second layer is too high, stretching may cause the polyester for the second layer to have birefringence due to stretching. Accordingly, the difference in the refractive index between the first layer and the second layer in the stretching direction may become small, and the reflection performance may be reduced.

Among the copolymerized polyesters described above, an amorphous copolymerized polyester is preferred from the viewpoint of extremely excellent suppression of haze increase due to crystallization in heat treatment at a temperature of 90° C. for 1000 hours. The term "amorphous" as used herein means that the crystal fusion heat determined using DSC when the temperature is raised at a temperature rise rate of 20° C./minute is less than 0.1 mJ/mg.

Specific examples of the copolymerized polyester for the second layer include (1) a copolymerized polyester containing a 2,6-naphthalenedicarboxylic acid component as a dicarboxylic acid component and an ethylene glycol component and a trimethylene glycol component as diol components, and (2) a copolymerized polyester containing a 2,6-naphthalenedicarboxylic acid component and a terephthalic acid component as dicarboxylic acid components and an ethylene glycol component and a trimethylene glycol component as diol components.

The copolymerized polyester for the second layer preferably has an intrinsic viscosity of 0.50 to 0.70 dl/g, and more preferably 0.55 to 0.65 dl/g, as measured using an o-chlorophenol solution at 35° C. When the copolymerized polyester for use in the second layer contains a trimethylene glycol component as a copolymer component, film formability may be reduced; however, by using the copolymerized polyester having an intrinsic viscosity in the above range, film formability can be further improved. When the copolymerized polyester described above is used as the second layer, the intrinsic viscosity of the copolymerized polyester is preferably higher from the viewpoint of film formability; however, if the intrinsic viscosity is higher than the upper limit, the difference in melt viscosity between the polyester for the first layer and the polyester for the second layer is increased, which causes the thicknesses of each layer to be non-uniform.

Thick Film Layer

Examples of thick film layers in one embodiment of the present invention include an outermost layer and an intermediate layer described later.

The multilayer laminated film according to one embodiment of the present invention may comprise an outermost thick film layer on one or both surfaces thereof. The term "thick film" as used herein means an optically thick film. The outermost layer is composed mainly of a resin. Here, the phrase "composed mainly of" means that the resin makes up 70 mass % or more, preferably 80 mass % or more, and more preferably 90 mass % or more, of the total mass of the layer. The outermost layer is preferably an isotropic layer, the resin of the outermost layer may be the same resin as that of the second layer from the viewpoint of ease of production, the outermost layer can be formed from the copolymerized polyester for the second layer mentioned above, and such an embodiment is preferred.

The multilayer laminated film according to one embodiment of the present invention may comprise an intermediate layer. In one embodiment of the present invention, the intermediate layer may be referred to as, for example, the "inner thick film layer" and means a thick film layer present inside the multilayer structure. In one embodiment of the present invention, a method is preferably used in which a thick layer (which may be referred to as "thickness adjustment layer" or "buffer layer") is formed on both sides of the alternately laminated structure in the initial stage of the production of the multilayer laminated film, and the number of layers laminated is then increased by doubling. In this case, two thick layers are laminated to form an intermediate layer. A thick film layer formed inside is referred to as an "intermediate layer," and a thick film layer formed outside is referred to as an "outermost layer."

More specifically, the thickness of the outermost layer is, for example, preferably more than 1 μm, more preferably 3 μm or more, and even more preferably 5 μm or more, and is preferably 25 μm or less, and more preferably 20 μm or less. The thickness of the intermediate layer is, for example, preferably 5 μm or more, and is preferably 100 μm or less, and more preferably 50 µm or less. When the multilayer structure comprises such an outermost layer and/or intermediate layer as a part of the structure, the thickness of each of the first and second layers can be readily adjusted to be uniform without affecting optical functions such as the polarizing function. The outermost layer and the intermediate layer may have the same composition as that of the first layer or the second layer, or may have a composition that partially includes the composition of the first layer or the second layer. The outermost layer and the intermediate layer are thick and thus do not contribute to the reflection properties. On the other hand, the outermost layer and the intermediate layer may affect the transmission properties; thus, when the layers contain particles, the particle diameter and the particle concentration are selected in consideration of light transmittance. By using the outermost layer or the intermediate layer, the total thickness of the film can be increased to, for example, improve handling.

If the thickness of the outermost layer and/or the intermediate layer is less than the lower limit, the layer structure of the multilayer structure may become disordered, and the reflection performance may be reduced. On the other hand, if the thickness of the outermost layer and/or the intermediate layer is more than the upper limit, the entire multilayer laminated film may be too thick, which makes it difficult to save space when the film is used as a reflective polarizer or a luminance-improving member for a thin liquid crystal display. When the multilayer laminated film comprises an outermost layer on both surfaces thereof or when the multilayer laminated film comprises a plurality of intermediate layers in it, the thickness of each outermost layer and/or the thickness of each intermediate layer is preferably not less than the lower limit of the range of the thickness of the respective layers, and the total thickness of the outermost layers and/or the total thickness of the intermediate layers is preferably not greater than the upper limit of the range of the thickness of the respective layers.

The polymer used in the outermost layer or the intermediate layer may contain a resin different from that of the first layer or the second layer as long as the layer can be present in the multilayer structure using the method for producing the multilayer laminated film according to one embodiment of the present invention; however, in order to achieve higher interlayer adhesion, the polymer preferably has the same composition as that of the first layer or the second layer, or has a composition that partially includes the composition of the first layer or the second layer.

The methods for forming the outermost layer and the intermediate layer are not particularly limited. For example, two outermost layers grid one intermediate layer can be formed by forming a thick layer or both sides of an alternately laminated structure before performing doubling, dividing the alternately laminated structure into two parts in the direction perpendicular to the alternately laminating direction by using a dividing block called a "layer doubling block", and re-laminating the parts in the alternately laminating direction. A plurality of intermediate layers can be further formed by increasing the number of divisions or increasing the number of times that the laminated structure is divided.

Other Layer

Coating Layer

The multilayer laminated film according to one embodiment of the present invention may have a coating layer on at least one surface of the film. Examples of such coating layers include a lubricating layer for imparting lubricating properties; a primer layer for imparting adhesion to, for example, a prism layer or a diffusion layer; and the like. The coating layer contains a binder component, and may contain, for example, particles in order to impart lubricating properties. To impart adhesion, for example, a binder component chemically close to the component of a layer to be attached may be used. The coating liquid for forming the coating layer is preferably an aqueous coating liquid containing water as a solvent from the environmental point of view. Particularly in such a case, the coating liquid may contain a surfactant in order to improve the wettability of the coating liquid with respect to the multilayer laminated film. In addition, a functional agent may be added; for example, a crosslinking agent may be added to increase the strength of the coating layer.

Method for Producing Multilayer Laminated Film

The method for producing the multilayer laminated film according to one embodiment of the present invention is described below in detail. The production method described below is an example, and the present invention is not limited to this example. Further, different embodiments of the film can be obtained with reference to the following method.

The multilayer laminated film according to one embodiment of the present invention can be obtained by a method in which a polymer forming the first layer and a polymer forming the second layer are alternately laminated in a molten state using a multilayer feedblock apparatus to form an alternately laminated structure having, for example, 30 layers or more in total, a buffer layer is formed on both sides of the laminated structure, the alternately laminated structure having the buffer layers is then divided into, for example, 2 to 4 parts by using an apparatus called "layer doubling," and the number of layers laminated is increased by re-laminating the alternately laminated structure having the buffer layers as one block on another one so that the number of blocks laminated (doubling number) increases 2 to 4 times. By this method, the multilayer laminated film having an intermediate layer composed of two buffer layers laminated inside the multilayer structure and an outermost layer composed of one buffer layer on both sides of the multilayer structure can be obtained.

In the alternately laminated structure, the first layer and the second layer are laminated so that the thickness of each of the first and second layers gradually increases or decreases as desired. This can be achieved by, for example, changing the widths or lengths of the slits in a multilayer feedblock apparatus. For example, the widths or lengths of the slits may be adjusted so that the apparatus has a portion for forming the monotonously increasing region and a portion for forming the thin layer region.

The desired number of layers are laminated by the method described above, extruded through a die, and cooled on a casting drum, thereby obtaining a multilayer unstretched film. The multilayer unstretched film is preferably stretched in at least a uniaxial direction (wherein the uniaxial direction is a direction along the film plane) selected from the film-forming machine axial direction (which may be referred to as "machine direction," "longitudinal direction," or "MD direct-ion") and the direction perpendicular to the film-forming machine axial direction in the film plane (which may be referred to as "traverse direction," "width direction," or "TD direction"). The stretching temperature is preferably in the range of the glass transition temperature (Tg) of the polymer for the first layer to (Tg+20)° C. The orientation properties of the film can be more precisely controlled by stretching the film at a temperature lower than a conventional stretching temperature.

The stretch ratio is preferably 2.0 to 7.0, and more preferably 4.5 to 6.5. The stretch ratio is preferably larger within this range because variations in the refractive index in the plane direction in the individual first and second layers are reduced due to a reduction in the layer thickness by stretching, the optical interference by the multilayer laminated film becomes uniform in the plane direction, and the difference in the refractive index in the stretching direction between the first layer and the second layer is increased. In this case, a known stretching method, such as heat stretching using a rod heater, roll heat stretching, or tenter stretching, can be used. Tenter stretching is preferable from the viewpoint of, for example, reduction in scratches produced by contact with a roller, and stretching speed.

When a stretching treatment is also carried out in the direction (MD direction) perpendicular to the stretching direction in the film plane for biaxial stretching, although the stretch ratio varies depending on the use, the stretch ratio is preferably as low as about 1.01 to 1.20 in order to impart reflective polarizing properties. When the stretch ratio in the MD direction is higher than the above value, the polarizing performance may be reduced.

Further, the orientation properties of the obtained multilayer laminated film can be more precisely controlled by re-stretching in the stretching direction in the range of 5 to 15% after stretching while performing heat-setting at a temperature of Tg to Tg+30° C.

In one embodiment of the present invention, when the coating layer described above is provided, the coating liquid can be applied to the multilayer laminated film in any stage, preferably during the process of producing the film. The coating liquid is preferably applied to the film before being stretched.

Thus, the multilayer laminated film according to one embodiment of the present invention is obtained.

When the multilayer laminated film is used in applications such as a metallic gloss film and a reflective mirror, the multilayer laminated film is preferably a biaxially stretched film. In this case, a successive biaxial stretching method or a simultaneous biaxial stretching method may be used. The stretch ratio may be adjusted so that the refractive index and the thickness of each of the first and second layers attain desired reflection properties. For example, considering the general refractive indexes of the resins forming these layers, the stretch ratio in the machine direction and the stretch ratio in the traverse direction may be both about 2.5 to 6.5.

EXAMPLES

Embodiments of the present invention are described below with reference to Examples; however, the present invention is not limited to the following Examples. The physical properties and characteristics shown in the Examples were measured or evaluated by using the methods described below.

(1) Thickness of Each Layer

A multilayer laminated film was cut 2 mm in the longitudinal direction of the film and 2 cm in the width direction of the film, fixed in an embedding capsule, and then embedded by using an epoxy resin (Epomount produced by Refine Tec Ltd.). The embedded sample was cut perpendicular to the width direction with a microtome (ULTRACUT UCT produced by LEICA) to obtain a thin section having a thickness of 50 nm. The section was observed and photographed using a transmission electron microscope (Hitachi S-4300) at an acceleration voltage of 100 kV, and the thickness (physical thickness) of each layer was measured from the photograph.

Regarding the layers having a thickness of more than 1 μm, a layer that was present inside the multilayer structure was regarded as an intermediate layer, and a layer that was present on an outermost surface was regarded as an outermost layer. The thickness of each layer was measured.

Whether a layer is the first layer or the second layer can be determined based on the refractive index. However, if it is difficult to determine this, it can be determined by the electronic state through NMR analysis or TEM analysis. The refractive index of each layer can also be determined from a single layer that is the same as the layer.

(2) Determination of Monotonic Increase

The thickness of each layer was calculated by using the above method, and the physical thickness of each repeating unit was determined according to the following equation (2). The layers in a region in which the thickness shows an increasing trend of a layer thickness profile (which was obtained by plotting the physical thickness of each repeating unit on the vertical axis and plotting each repeating unit number on the horizontal axis) were equally divided into five areas in terms of the number of layers. When the average thickness in each equally divided area monotonously increases in the direction in which the thickness increases, the thickness is regarded as monotonously increasing; otherwise, the thickness is not regarded as monotonously increasing.

$$dp = d1 + d2 \qquad \text{(equation 2)}$$

wherein dp represents the physical thickness of the repeating unit, and d1 and d2 represent the physical thicknesses (nm) of the first layer and the second layer that constitute the repeating unit, respectively.

(3) Interlayer Adhesion

A sample that was partially delaminated was prepared by, for example, impacting an end surface portion of the multilayer laminated film with a needle or the like. Thereafter, to reduce variations in measurement, the sample was allowed to stand for 1 day at a temperature of 23° C. and a relative humidity of 50 to 60% RH, and then cut into a strip having a width of 25 mm and a length of 100 mm. The sample was attached to a 3-mm-thick acrylic plate, the surface of which was clean, with double-sided adhesive tape, and pressed directly with a rubber roller to adhere it to the plate. At this time, the thicker side of the delaminated sample was attached to the acrylic plate. The resulting sample was placed in a tensile tester (STROGRAPH produced by Toyo Seiki Seisaku-sho, Ltd.), and the thin side of the delaminated sample was fixed to the chucks. A 90° peel test was performed at a pull rate of 300 mm/min to measure the strength. By this method, the strengths in the MD direction and the TD direction of the multilayer laminated film were measured, and the average value of the strengths was defined as the interlayer adhesion.

The interlayer adhesion is preferably 100 g/25 mm or more, more preferably 130 g/25 mm or more, even more preferably 150 g/25 mm or more, and particularly preferably 170 g/25 mm or more, in terms of the average value of the strengths in the MD direction and the TD direction. High interlayer adhesion is preferable. Further, both the strength in the MD direction and the strength in the TD direction are preferably 100 g/25 mm or more, more preferably 120 g/25 mm or more, and even more preferably 140 g/25 mm or more.

Production Example 1

Polyester A

A polyester for the first layer was prepared as follows. Dimethyl 2,6-naphthalenedicarboxylate, dimethyl terephthalate, and ethylene glycol were subjected to a transesterification reaction in the presence of titanium tetrabutoxide, and subsequently further subjected to a polycondensation reaction to prepare a copolymerized polyester in which 95 mol % of the acid component is a 2,6-naphthalenedicarboxylic acid component, 5 mol % of the acid component is a terephthalic acid component, and the glycol component is an ethylene glycol component (intrinsic viscosity: 0.64 dl/g; measured using o-chlorophenol at 35° C.; this applies to the following).

Production Example 2

Polyester B

A polyester for the second layer was prepared as follows. Dimethyl 2,6-naphthalenedicarboxylate, dimethyl terephthalate, ethylene glycol, and trimethylene glycol were subjected to a transesterification reaction in the presence of titanium tetrabutoxide, and subsequently further subjected to a polycondensation reaction to prepare a copolymerized polyester in which 50 mol % of the acid component is a 2,6-naphthalenedicarboxylic acid component, 50 mol % of the acid component is a terephthalic acid component, 85 mol % of the glycol component is an ethylene glycol component, and 15 mol % of the glycol component is a trimethylene glycol component (intrinsic viscosity: 0.63 dl/g).

Example 1

Polyester A for the first layer was dried at 170° C. for 5 hours, and polyester B for the second layer was dried at 85° C. for 8 hours. Thereafter, polyester A and polyester B were respectively fed to first and second extruders and heated to 3000° C. so that they were in a molten state. The polyester for the first layer was divided into 139 layers, and the polyester for the second layer was divided into 138 layers. A melt in a laminated state having 277 layers in total was obtained using a multilayer feedblock apparatus equipped with comb teeth for alternately laminating the first layer and the second layer and obtaining the layer thickness profile shown in Table 1. While the laminated state was maintained, the same polyester as the polyester for the second layer was introduced to both sides of the melt from a third extruder toward a three-layer feed block to further laminate a buffer layer on both sides in the laminating direction of the melt (both surface layers of which were the first layers) in a laminated state having 277 layers. The feed rate of the third extruder was adjusted so that the total of the buffer layers on both sides was 47% of the whole. The melt in the laminated state was further divided into two parts using a layer doubling block, and they were laminated at a ratio of 1:1, thereby preparing an unstretched multilayer laminated film having 557 layers in total, including an intermediate layer inside the film and two outermost layers on the outermost surfaces.

The unstretched multilayer laminated film was stretched 5.9 times in the width direction at 130° C. The obtained uniaxially stretched multilayer laminated film had a thickness of 75 μm. The results of refractive index measurement showed that the first layer was birefringent and that the second layer was isotropic.

Examples 2 to 8 and Comparative Examples 1 to 4

Uniaxially stretched multilayer laminated films were obtained in the same manner as in Example 1, except that the multilayer feedblock apparatus used was changed so that the layer thickness profiles shown in Tables 1 and 2 were obtained.

The average reflectance of each of the multilayer laminated films of Examples 1 to 8 was determined using a polarizing film measurement apparatus (VAP7070S produced by JASCO Corporation). The average transmittance was determined at 5 nm intervals in the wavelength range of 380 to 780 nm, and the value obtained by subtracting the average transmittance from 100 was regarded as the average reflectance at the reflection axis at normal incidence. When the average reflectance was 50% or more, it was determined that the film was capable of reflecting light in the wavelength range. In the measurement, a spot diameter adjusting mask Φ 1.4 and a deviation angle stage were used, the angle of incidence of the measurement light was set to 0 degrees, and the axis perpendicular to the transmission axis of the multilayer laminated film determined by a crossed Nicols search (650 nm) was regarded as the reflection axis.

The films of Examples 1 to 3, 5, and 8 satisfied A2/L1 described above also in the range of three and four repeating units from the thick film layer.

The films of Examples 4 and 6 satisfied A2/L1 described above also in the range of three, four, and five repeating units from the thick film layer.

In Examples 4 and 6, since the repeating unit of No. 132 had a thickness that was more than 0.85 times the maximum repeating unit thickness L1, it was determined that the repeating units of No. 133 and after were a thin layer region.

In Example 5, since the repeating unit of No. 133 had a thickness that was more than 0.85 times the maximum repeating unit thickness L1, it was determined that the repeating units of No. 134 and after were a thin layer region.

Comparative Examples 1 and 2 showed the maximum repeating unit thickness L2 in the repeating unit of No. 137, which was more than 0.85 times the maximum repeating unit thickness L1, and thus did not have a thin layer region. Therefore, five repeating units from the side in contact with the thick film layer were observed and evaluated.

In Comparative Examples 3 and 4, the repeating unit of No. 135 had a thickness that was more than 0.85 times the maximum repeating unit thickness L1, and thus there was a possibility that the repeating units of No. 136 and after may be a thin layer region. However, the average thickness A2 of the three repeating units of Nos. 136 to 138 was more than 0.70 times the maximum repeating unit thickness L1, which indicates that the films of these Comparative Examples did not have a thin layer region. Therefore, three repeating units from the side in contact with the thick film layer were observed and evaluated.

TABLE 1

|  |  | Example 1 | Example 2 | Example 3 | Example 4 | Example 5 | Example 6 | Example 7 | Example 8 |
|---|---|---|---|---|---|---|---|---|---|
| Doubling (dividing) | | 2 | 2 | 2 | 2 | 2 | 2 | 2 | 2 |
| Total number of repeating units of one packet | | 138 | 138 | 138 | 138 | 138 | 138 | 138 | 138 |
| Monotonously increasing thickness region | Range (repeating unit No.) | 1 to 133 | 1 to 133 | 1 to 133 | 1 to 132 | 1 to 133 | 1 to 132 | 1 to 135 | 1 to 133 |
| | Number of repeating units N1 | 133 | 133 | 133 | 132 | 133 | 132 | 135 | 133 |
| | Minimum repeating unit thickness (nm) S1 | 120 | 86 | 94 | 104 | 91 | 111 | 113 | 128 |
| | Repeating unit number having minimum thickness | 3 | 1 | 8 | 2 | 2 | 2 | 1 | 1 |
| | Maximum repeating unit thickness (nm) L1 | 314 | 245 | 266 | 262 | 248 | 286 | 306 | 279 |
| | Repeating unit number having maximum thickness | 133 | 133 | 133 | 118 | 130 | 130 | 135 | 133 |
| Thin layer region | Range (repeating unit No.) | 134 to 138 | 134 to 138 | 134 to 138 | 133 to 138 | 134 to 138 | 133 to 138 | 136 to 138 | 134 to 138 |
| | Number of repeating units N2 | 5 | 5 | 5 | 6 | 5 | 6 | 3 | 5 |
| | Maximum repeating unit thickness (nm) L2 | 206 | 170 | 170 | 161 | 144 | 201 | 194 | 219 |
| | Average repeating unit thickness (nm) A2 | 159 | 139 | 132 | 135 | 114 | 175 | 151 | 176 |
| L2/L1 | | 0.66 | 0.70 | 0.64 | 0.61 | 0.58 | 0.70 | 0.63 | 0.78 |
| A2/L1 | | 0.51 | 0.57 | 0.50 | 0.51 | 0.46 | 0.61 | 0.49 | 0.63 |
| L2/S1 | | 1.72 | 1.97 | 1.80 | 1.55 | 1.58 | 1.82 | 1.72 | 1.71 |
| Interlayer adhesion | MD (g/25 mm) | 180 | 160 | 180 | 170 | 180 | 170 | 140 | 140 |
| | TD (g/25 mm) | 200 | 180 | 210 | 220 | 230 | 190 | 160 | 130 |
| | Average value (g/25 mm) | 190 | 170 | 195 | 195 | 205 | 180 | 150 | 135 |

TABLE 2

|  |  | Comparative Example 1 | Comparative Example 2 | Comparative Example 3 | Comparative Example 4 |
|---|---|---|---|---|---|
| Doubling (dividing) | | 2 | 2 | 2 | 2 |
| Total number of repeating units of one packet | | 138 | 138 | 138 | 138 |
| Monotonously increasing thickness region | Range (repeating unit No.) | 1 to 133 | 1 to 133 | 1 to 135 | 1 to 135 |
| | Number of repeating units N1 | 133 | 133 | 135 | 135 |
| | Minimum repeating unit thickness (nm) S1 | 82 | 107 | 98 | 217 |
| | Repeating unit number having minimum thickness | 1 | 1 | 1 | 1 |
| | Maximum repeating unit thickness (nm) L1 | 264 | 294 | 255 | 273 |
| | Repeating unit number having maximum thickness | 133 | 133 | 132 | 123 |
| Thin layer region | Observed range (repeating unit No.) | 134 to 138 | 134 to 138 | 136 to 138 | 136 to 138 |
| | Number of repeating units in observed range N2 | 5 | 5 | 3 | 3 |
| | Maximum repeating unit thickness (nm) in observed range L2 | 244 | 281 | 201 | 197 |
| | Repeating unit number having maximum thickness | 137 | 137 | 137 | 137 |
| | Average repeating unit thickness (nm) in observed range A2 | 195 | 196 | 193 | 196 |
| L2/L1 | | 0.92 | 0.96 | 0.79 | 0.72 |
| A2/L1 | | 0.74 | 0.67 | 0.76 | 0.72 |
| L2/S1 | | 2.98 | 2.63 | 2.05 | 0.91 |
| Interlayer adhesion | MD (g/25 mm) | 120 | 130 | 140 | 100 |
| | TD (g/25 mm) | 30 | 40 | 30 | 30 |
| | Average value (g/25 mm) | 75 | 85 | 85 | 65 |

INDUSTRIAL APPLICABILITY

According to one embodiment of the present invention, as the multilayer laminated film of the present invention, a multilayer laminated film that is less susceptible to delamination between a multilayer laminated structure and a thick film layer can be obtained by suitably designing a layer thickness profile in terms of the physical thickness of a repeating unit of the first layer and the second layer alternately laminated. When the film is used as an optical member such as a luminance-improving member or a reflective polarizer, delamination does not occur due to an external force applied during attachment to another member, assembly of a liquid crystal display, or use. Thus, a more highly reliable luminance-improving member, polarizer for a liquid crystal display, and the like can be provided.

The entire disclosure of Japan Patent Application No. 2017-133703 filed on Jul. 7, 2017, is incorporated herein by reference.

All documents, patent applications, and technical standards referred to in the present specification are incorporated herein by reference to the same extent as if these individual documents, patent applications, and technical standards were specifically and individually indicated to be incorporated by reference.

DESCRIPTION OF REFERENCE NUMERALS

1 Thick film layer (outermost layer)
2 Thick film layer (intermediate layer)
3 Multilayer laminated structure

The invention claimed is:

1. A multilayer laminated film comprising
at least one multilayer laminated structure in which a first layer containing a first resin and a second layer containing a second resin are alternately laminated, and
at least one outermost layer having a thickness of 1-25 μm that is in contact with the multilayer laminated structure,
wherein
when the multilayer laminated film comprises a plurality of the multilayer laminated structures, the multilayer laminated film comprises at least one intermediate layer;
the multilayer laminated structure has a layer thickness profile in terms of a physical thickness of a repeating unit having one first layer and one second layer, and the layer thickness profile has a monotonously increasing thickness region and a thin layer region;
the thin layer region has at least three repeating units and is a region in which the L2/L1 ratio is 0.85 or less, where L2 is the maximum repeating unit thickness in the thin layer region, and L1 is the maximum repeating unit thickness in the monotonously increasing thickness region, and the A2/L1 ratio is 0.70 or less, where A2 is the average repeating unit thickness in the thin layer region, and L1 is the maximum repeating unit thickness in the monotonously increasing thickness region; and
the thin layer region is on the thicker side of the monotonously increasing thickness region and is in direct contact with the outermost layer or intermediate layer.

2. The multilayer laminated film according to claim 1, wherein the L2/S1 ratio exceeds 1.0, where L2 is the maximum repeating unit thickness in the thin layer region, and S1 is the minimum repeating unit thickness in the monotonously increasing thickness region.

3. The multilayer laminated film according to claim 1, wherein the first layer is birefringent, the second layer is isotropic, and the film is capable of reflecting light at a wavelength of 380 to 780 nm by optical interference of the layers.

4. A luminance-improving member comprising the multilayer laminated film according to claim 1.

5. A polarizer for a liquid crystal display, the polarizer comprising the multilayer laminated film according to claim 1.

6. The multilayer laminated film according to claim 2, wherein the first layer is birefringent, the second layer is isotropic, and the film is capable of reflecting light at a wavelength of 380 to 780 nm by optical interference of the layers.

7. A luminance-improving member comprising the multilayer laminated film according to claim 2.

8. A luminance-improving member comprising the multilayer laminated film according to claim 3.

9. A luminance-improving member comprising the multilayer laminated film according to claim 6.

10. A polarizer for a liquid crystal display, the polarizer comprising the multilayer laminated film according to claim 2.

11. A polarizer for a liquid crystal display, the polarizer comprising the multilayer laminated film according to claim 3.

12. A polarizer for a liquid crystal display, the polarizer comprising the multilayer laminated film according to claim 6.

13. The multilayer laminated film according to claim 1, wherein the thin layer region has 3 to 15 repeating units.

14. The multilayer laminated film according to claim 6, wherein the thin layer region has 3 to 15 repeating units.

15. A luminance-improving member comprising the multilayer laminated film according to claim 13.

16. A luminance-improving member comprising the multilayer laminated film according to claim 14.

17. A polarizer for a liquid crystal display, the polarizer comprising the multilayer laminated film according to claim 13.

18. A polarizer for a liquid crystal display, the polarizer comprising the multilayer laminated film according to claim 14.

* * * * *